United States Patent
Li et al.

(10) Patent No.: US 11,085,405 B2
(45) Date of Patent: Aug. 10, 2021

(54) CHARGE AIR COOLER (CAC) CONDENSATE DISPERSION SYSTEM AND METHOD OF DISPERSING CONDENSATE FROM A CAC

(71) Applicant: GM Global Technology Operations LLC, Detroit, MI (US)

(72) Inventors: Bin Li, Troy, MI (US); Guangzhi Zhao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 16/375,442

(22) Filed: Apr. 4, 2019

(65) Prior Publication Data
US 2020/0318583 A1    Oct. 8, 2020

(51) Int. Cl.
*F02M 31/20* (2006.01)
*F02B 37/00* (2006.01)

(52) U.S. Cl.
CPC .............. *F02M 31/20* (2013.01); *F02B 37/00* (2013.01)

(58) Field of Classification Search
CPC .................................. F02B 37/00; F02M 31/20
See application file for complete search history.

(56) References Cited

U.S. PATENT DOCUMENTS

| 2004/0079079 A1* | 4/2004 | Martin ................... F01N 3/005 60/605.2 |
| 2010/0229549 A1* | 9/2010 | Taylor ................. F02B 29/0468 60/599 |
| 2015/0135705 A1* | 5/2015 | Pursifull ................ F02M 26/05 60/599 |
| 2017/0058841 A1 | 3/2017 | Nyeholt et al. |

OTHER PUBLICATIONS

Lasecki, James A. U.S. Appl. No. 15/833,333, filed Dec. 6, 2017, "Charge Air Cooler (CAC) Having a Condensate Dispersion Device and a Method of Dispersing Condensate From a CAC".

\* cited by examiner

*Primary Examiner* — Kevin A Lathers
(74) *Attorney, Agent, or Firm* — Vivacqua Crane

(57) ABSTRACT

A charge air cooler (CAC) condensation dispersion system including a compressor for generating a hot compressed air flow; a CAC having an inlet tank for receiving the hot compressed air flow and an outlet tank for discharging a cooled compressed air flow; a condensate pickup tube having an inlet disposed in a lower volume of space within the outlet tank and an opposite outlet; and a condensate conveyance tube having a first end connected to the outlet of the pickup tube and an opposite second in in fluid connection with the inlet of the compressor. A solenoid actuated control valve is disposed in-line with the condensate conveyance tube. A controller configured to send a signal to the solenoid valve to selectively cycle the control valve between an open state and a closed state. An in-line orifice plate is disposed adjacent the second end of the condensate conveyance tube.

6 Claims, 2 Drawing Sheets

Figure 1:
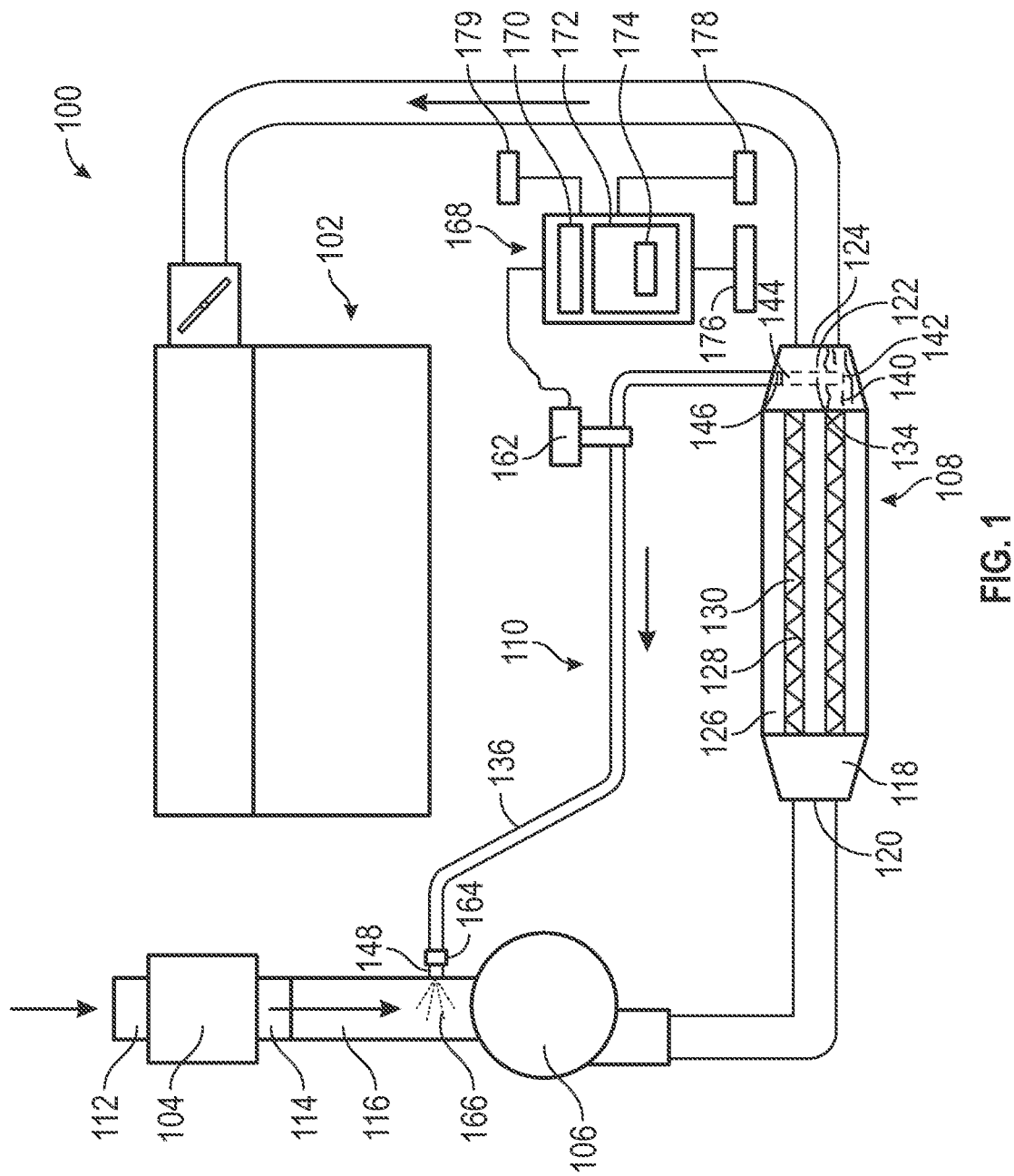
Figure 2:
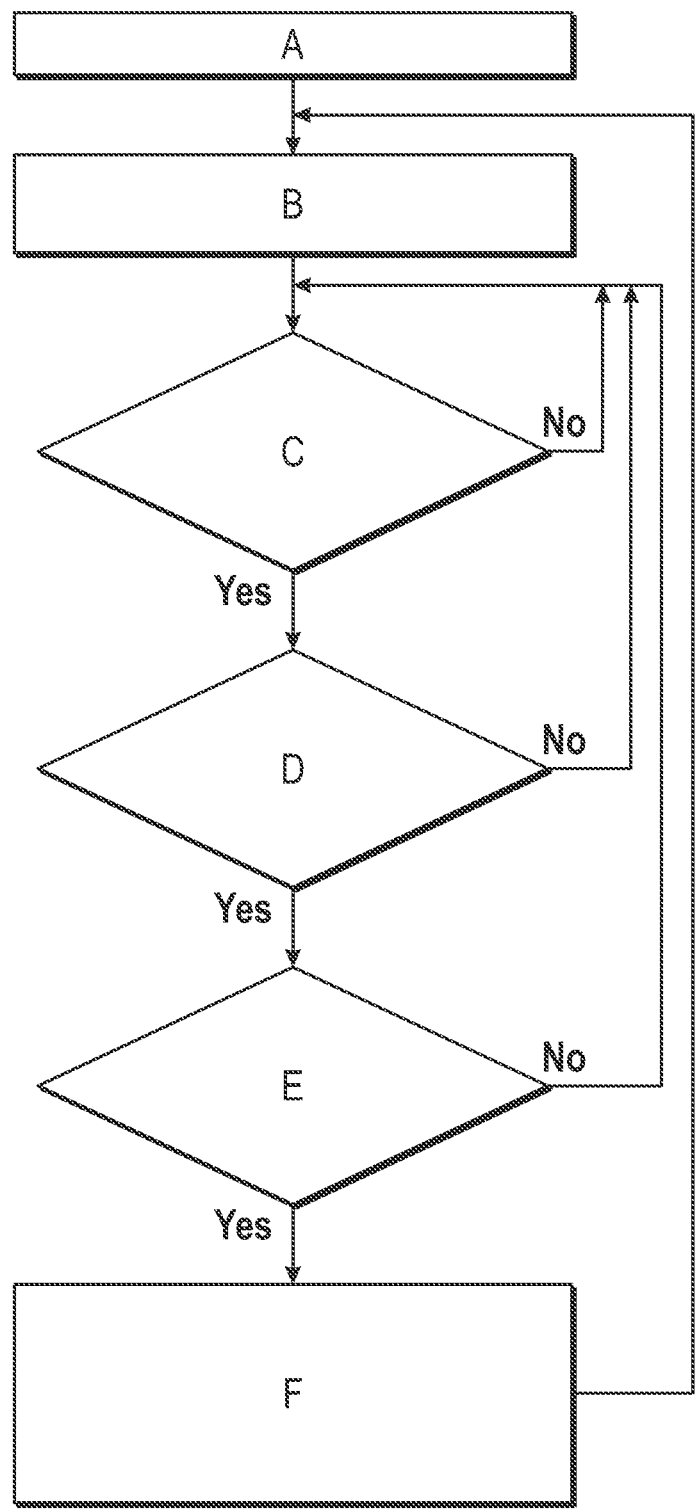

CHARGE AIR COOLER (CAC) CONDENSATE DISPERSION SYSTEM AND METHOD OF DISPERSING CONDENSATE FROM A CAC

INTRODUCTION

The present disclosure relates to a condensate dispersion system for a force induction engine of a motor vehicle, and more particularly to a charge air cooler condensation dispersion system.

Modern engines utilizes compressors, such as superchargers and turbochargers, to increase the power output of smaller displacement internal combustion engines to match the power output of larger displacement internal combustion engines. The compressors increase the density of air to enable the combustion process to burn more fuel per cycle, thus increasing power output when required. Internal combustion engines using compressors are commonly known as forced induction engines.

The temperature of the compressed air exiting the compressors, also known as combustion air, is significantly higher than the ambient intake air due to the compression process. Charge air coolers (CAC) are employed to remove excessive heat from the compressed combustion air prior to the intake manifold of the internal combustion engine to further enhance combustion efficiency, resulting in improved fuel economy and fewer undesirable emissions. CAC are typically air-to-air or air-to-water heat exchangers where heat from the higher temperature compressed combustion air flowing through the CAC is transferred to an exterior air or coolant flow, resulting in a reduction in temperature of the combustion airflow.

The effectiveness of the CAC can cause the compressed combustion airflow through the CAC to experience a transition in temperature to fall below the dew point temperature, thereby causing moisture in the combustion air to condense forming liquid condensate within the CAC. A sufficient volume of condensate may accumulate within the CAC, which may be dislodged in the form of droplets back into the combustion airflow exiting the CAC and carried to the intake manifold. Unmetered condensate droplets entering the combustion chamber of the engine may hinder the combustion process, thus resulting in undesirable engine performance. This is especially true for smaller engines operating in humid environments because of the higher operating interval of the compressors, even in steady state partial load conditions, as compared to larger engines.

Thus, while current CAC achieves their intended purpose, there is a need for a CAC having a condensate dispersion system, and a method for dispersing condensate from CAC to provide combustion airflow to internal combustion engines.

SUMMARY

According to several aspects, a charge air cooler (CAC) condensation dispersion system is disclosed. The CAC condensation dispersion system includes a compressor having a compressor inlet and a compressor outlet; a CAC having an inlet tank in fluid connection with the compressor outlet and an outlet tank, wherein the outlet tank includes a lower volume of space for an accumulation of a condensate; a condensate pickup tube having a pickup tube inlet disposed within the lower volume of space within the outlet tank and an opposite pickup tube outlet; and a condensate conveyance tube having a first end connected to the pickup tube outlet and an opposite second end in fluid communication with the compressor inlet.

In an additional aspect of the present disclosure, the CAC condensation dispersion system further includes an inlet duct connected to the compressor inlet. The second end of the condensate conveyance tube is in fluid connection with the inlet duct adjacent to the inlet of the compressor.

In another aspect of the present disclosure, the condensate pickup tube is a venturi tube.

In another aspect of the present disclosure, the CAC condensation dispersion system of further includes a control valve disposed in-line the condensate conveyance tube between the first end and second end of the condensate conveyance tube. The control valve is configured to selectively allow the condensate to flow through the condensate conveyance tube from the first end to the second end.

In another aspect of the present disclosure, the CAC condensation dispersion system further includes an in-line orifice plate disposed in the condensate conveyance tube adjacent the second end of the condensate conveyance tube.

In another aspect of the present disclosure, the in-line orifice plate defines an orifice nozzle configured to disperse a plug of liquid condensate into a mist condensate into the inlet duct.

In another aspect of the present disclosure, the control valve is a solenoid-controlled control valve. The CAC condensation dispersion system further includes a controller configured to generate and output a signal to the solenoid-controlled control valve for selectively cycling the solenoid-controlled control valve.

In another aspect of the present disclosure, the controller is configured to receive and process information from at least one of an environmental sensor, a vehicle state sensor, and engine control module for generating and outputting the signal.

In another aspect of the present disclosure, the vehicle state sensor includes at least one of a throttle inlet air pressure sensor. The environmental sensor includes an ambient air humidity sensor. The engine control module includes a calibrated torque map.

In another aspect of the present disclosure, the controller further includes a timer.

According to several aspects, a method of dispersing condensate from a charge air cooler (CAC) in a forced induction engine system having an engine and a compressor is disclosed. The method includes the steps of supplying compressed air, by the compressor, through the CAC to an intake manifold of the engine; determining an ambient relative humidity (Amb Rh); determining a throttle inlet air pressure (TIAP) of the intake manifold; determining the relative engine torque demand (EngTorq %) of the engine; and conveying a condensate from an outlet tank of the CAC through a condensate conveyance tube to an inlet of the compressor when the Amb Rh is above a predetermined humidity, the TIAP is above a predetermined pressure, and the EngTorq is below a predetermined percent.

In an additional aspect of the present disclosure, the method further includes actuating a control valve, disposed in-line with the condensate conveyance tube, in the open position to allow the condensate to flow through the condensate conveyance tube.

In another aspect of the present disclosure, the method further includes totalizing an amount of time when both the Amb Rh is above a predetermined humidity and the TIAP is above a predetermined TIAP; and actuating the control valve after the totalize amount of time is above a predetermined time value.

In another aspect of the present disclosure, totalizing an amount of time when both the Amb Rh is above a predetermined humidity and the TIAP is above a predetermined pressure; determining a second TIAP of the intake manifold after the totalize amount of time is above a predetermined time value; and actuating the control valve when the second TIAP is above a second predetermined TIAP.

In another aspect of the present disclosure, the EngTorq % is determined after the totalize amount of time is above the predetermined time value.

In another aspect of the present disclosure, actuating the control valve includes cycling the control valve between an open state and a close state at a predetermined frequency and for a predetermined length of time.

According to several aspects, a forced induction engine system for a vehicle is disclosed. The forced induction engine system includes a compressor having an inlet for receiving an air flow and an outlet for discharging a hot compressed air flow; a charge air cooler having an inlet tank for receiving the hot compressed air flow and an outlet tank for discharging a cooled compressed air flow, wherein the outlet tank includes a lower volume of space for the accumulation of a condensate; an internal combustion engine having an intake manifold for receiving the cooled compressed air flow from the outlet tank; a condensate pickup tube having an inlet disposed in the lower volume of space and an opposite outlet; and a condensate conveyance tube having a first end connected to the outlet of the pickup tube and an opposite second in in fluid connection to the inlet of the compressor.

In an additional aspect of the present disclosure, the forced induction engine system further includes an orifice plate disposed adjacent to the second end of the condensate conveyance tube. The orifice plate is configured to disperse a plug of liquid condensate exiting the second end of the condensate conveyance tube into a condensate mist entering the inlet of the compressor.

In another aspect of the present disclosure, the forced induction engine system further includes a solenoid control valve disposed in-line with the condensate conveyance tube; and a controller configured to send a signal to the solenoid valve to selectively cycle the control valve between an open state and a closed state.

In another aspect of the present disclosure, the force induction system further includes at least one of an environmental sensor, a vehicle state sensor, and an engine control module configured to send information to the controller. The controller is configured to receive and process the information to selectively cycling the control valve.

In another aspect of the present disclosure, the environmental sensor includes an ambient humidity sensor, the vehicle state sensor includes a throttle inlet air pressure (TIAP), and the engine control module includes a calibrated torque map.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 shows a schematic illustration of a forced induction engine system having a charge air cooler (CAC) condensate dispersion system, according to an exemplary embodiment; and FIG. 2 shows a method of dispersing condensate from a charge air cooler using the CAC condensate dispersion system of FIG. 1, according to an exemplary embodiment.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

FIG. 1 shows a forced induction engine system 100 having an internal combustion engine (engine) 102, an intake filter housing 104, an air compressor 106, and a charge air cooler (CAC) 108. The forced induction engine system 100 also includes a charge air cooler condensate dispersion system 110 that is configured to selectively disperse condensate from the CAC 108 by routing the condensate from an outlet tank 122 of the CAC 108 to the compressor 106 at predetermined operating conditions of the engine 102 to avoid any undesirable impact on engine performance. It is appreciated that the forced induction engine system 100 having the charge air cooler condensate dispersion system 110 is not limited for use in land motor vehicles, but may be used in water vehicles and air vehicles, as well as for powering a hybrid drive system for such vehicles.

The intake filter housing 104 contains a filter media (not shown) and includes an ambient air inlet 112 and a filtered air outlet 114. Ambient air enters the ambient air inlet 112, flows through the filter media filtering out particulate matter from the airflow that may plug or damage the force induction engine system 100, and exits the filtered air outlet 114. The filtered air exiting the air intake filter housing 104 is directed to the compressor 106 through the compressor inlet duct 116.

The compressor 106 may be that of a supercharger or a turbocharger type compressor. Supercharger type compressors are typically powered by a mechanical power-takeoff, such as a belt, gear, and/or shaft, from a crankshaft of the engine 102. Modern supercharger type compressors are powered by an electrical motor to avoid direct power draw from the engine 102. Turbocharger type compressors are powered by the hot exhaust gases of the engine 102, in which the hot exhaust gases turn a turbine that compresses the filtered airflow.

Based on output power demand, the compressor 106 selectively compresses the volume of filtered airflow to increase the density of the air flow, thereby providing more oxygen per unit volume of airflow to the engine 102 for more efficient combustion of fuel to increased power output. The greater the density of the combustion air supplied to the engine 102, the greater the output power that the engine 102 can generate. Also, the greater the density, the greater amount of heat is generated during the compression process. Exemplary temperatures of the compressed airflow exiting a turbocharger type compressor can be as high as 200° C.

The compressed airflow exiting the compressor 106 is routed through the CAC 108 to reduce the temperature of the compressed airflow by dissipating the heat from the compressed airflow to an external air or water flow. The exemplary CAC 108 shown is an air-to-air CAC, however, it is not limited to such and may include air-to-liquid CAC. The exemplary CAC 108 includes an inlet tank 118 having an air inlet port 120 and an air outlet tank 122 having an air outlet port 124. A plurality of airflow tubes 126 connect the inlet tank 118 to the outlet tank 122 defining a plurality of internal airflow passageways (not shown) for combustion air flow through the airflow tubes 126. A plurality of corrugated fins 128 interconnecting external surfaces of adjacent airflow tubes 126 to increase the external surface area of the CAC 108 for increased heat transfer efficiency. The corrugated fins 128 interconnecting adjacent airflow tubes defines a plurality of external airflow passageways 130 perpendicular to the airflow tubes 126. While corrugated type fin 128 are shown, it is appreciated that other types of air-side fins, such as plate fins, may be utilized to increase the external heat transfer area of the CAC 108.

In the exemplary CAC 108 shown, lower temperature ambient air flowing through the external airflow passageways 130 cools the higher temperature compressed airflow within the airflow tubes 126. In humid operating conditions, the ambient air flowing through the external airflow passageways 130 may provide sufficient cooling such that the compressed airflow within the airflow tubes 126 may drop below its dew point, which causes condensate droplets to form. The momentum of the compressed airflow through the airflow tubes 126 carries the condensate droplets to the outlet tank 122 of the CAC 108, where the condensate droplets collide and coalesces with one another and settles in a lower volume of space 132 within the outlet tank 122.

The CAC condensate dispersion system 110 is provided to selectively disperse the settled liquid condensate 140 from the outlet tank 122 of the CAC 108 into the inlet duct 116 of the compressor 106 at predetermined operating conditions of the engine to avoid any undesirable impact on engine performance. The charge air cooler condensate dispersion system 110 includes a condensate pickup tube 134 dispose within the lower volume of space 132 of the outlet tank 122 and a condensate conveyance tube 136 for conveying the condensate from the outlet tank 122 to the inlet duct 116 of the compressor 106. The condensate pickup tube 134 may be that of a venturi tube.

The outlet tank 122 includes an interior surface 138 defining the lower volume of space 132 where the liquid condensate 140 would settle under the force of gravity. The pickup tube 134 includes a tube inlet 142 disposed within the lower volume of space 132, with respect to the direction of gravity, such that any condensate settled within the lower volume of space 132 would come in physical contact with the tube inlet 142 of the pickup tube 134. The pickup tube 134 includes an outlet 144 that is coupled to an inlet 146 of the condensate conveyance tube 136. The condensate conveyance tube 136 includes an opposite outlet end 148 that is in fluid connection with the inlet duct 116 of the compressor 106.

When the compressor 106 is operating, the compressor 106 draws filtered air through the inlet duct 116 and compresses the volume of filtered airflow to increase the density of the air flow to the CAC 108, thus simultaneous decreasing the absolute pressure in the inlet duct 116 to approximately 85 to 90 Kilopascal (kPa) and increasing the absolute pressure in the CAC 108 to about 130 to 140 kPa for a typical internal combustion engine for a motor vehicle. The pressure differential between the inlet duct 116 and the outlet tank 122 of the CAC 108 is sufficient such that the higher pressure airflow through the outlet tank 122 urges plugs of condensate through the condensate pickup tube 134 into the condensate conveyance tube 136, which conveys the condensate to the lower pressure air flowing through the inlet duct 116 to the compressor 106.

A solenoid control valve 162 is provided in-line within the condensate conveyance tube 136 for selectively controlling the flow of condensate from the lower volume of space 132 of the outlet tank 122 of the CAC 108 to the inlet duct 116 of the compressor 106. An orifice plate 164 is disposed in-line with the condensate conveyance tube 136 proximal to the inlet duct 116. The orifice plate 164 may also be that of an orifice nozzle 164 configured to disperse plugs of condensate exiting the condensate conveyance tube 136 into a fine mist 166 directly into the inlet duct 116. The condensate control valve 162 is set normally in a closed position and is selectively actuated to an open position by a controller 168 to allow for the flow of condensate through the condensate conveyance tube 136.

The controller 168 may include processors 170 and non-transitive memories 172, and may be that of a microprocessor. The non-transitive memories contained software 174 routines including a method of operating the condensate dispersions system 110 that is executable by the processor 170. The controller 168 may be configured to receive input from environmental sensors 176, vehicle state sensors 178, and engine control module 179 for gathering data for use in implementing the method of operating the condensate dispersion system 110. The vehicle state sensors 178 include a throttle inlet air pressure (TIAP) disposed in the intake manifold and an engine torque output sensor. The controller 168 may also include a timer for measuring and totalizing the passage of time.

FIG. 4 shows a method 200 of dispersing condensate from the CAC 108 using the CAC condensate dispersion system 110. The instructions for the method may be implemented by the controller 168, which processes information received from the environmental sensor 176, vehicle state sensor 178, and engine control module 179 to generate a control signal that is sent to the control valve 162. The method starts in Step A when the internal combustion engine is operating.

In Step B, a timer is initiated by the controller 168 and set to 0. In Step C, the ambient relative humidity (Amb Rh) is determined and the throttle inlet air pressure (TIAP) is determined by the controller 168 from processing information received from the environmental sensor 176 and vehicle state sensor 178. The timer is started when both the TIAP is greater than 100 KPa and the Amb Rh is greater than 90%. The timer continues as long as both the TIAP is greater than 100 KPa and the Amb Rh is greater than 90%. If the TIAP drops below 100 KPa or the Amb Rh drops below 90%, then the timer is paused until both the TIAP returns to greater than 100 KPa and the Amb Rh is greater than 90%. Once the timer reaches a predetermined totalized time, for example 10 mins, the method proceeds to Step D.

In Step D, a second TIAP is determined to confirm that there is sufficient pressure differential between the outlet tank 122 and inlet duct 116 to purge the liquid condensate 140 from the outlet tank 122. If the second TIAP drops below a second predetermined pressure, for example 110 kPa, the method 200 returns to Step C. Otherwise, the method 200 proceeds to Step E.

In the Step E, the relative engine torque demand (EngTorq %) is determined to avoid purging at high output power demand to minimize any undesirable the impact on engine performance. The EngTorq % may be determined by the controller 168 based on information received from a vehicle state sensor 178, such as an engine torque sensor, or from a calibrated torque map contained in the engine control module 179.

If the EngTorq % is less a predetermined EngTorq %, for example less than 50 percent, then the method 200 proceeds to Step F. Otherwise, the method 200 returns to Step C. In Step F the solenoid control valve 162 is actuated for sufficient cycles to purge the liquid condensate 140 from the outlet tank 122 of the CAC 108. For example, the control valve 162 may be cycled between the open state and closed state for 100 cycles. Each cycle includes opening the control valve 162 for 500 micro-seconds and closing the control valve 162 for 500 micro-seconds.

It is appreciated that the numerical values for TIAP, Amb Rh, timer, and EngTorq % are provided as examples only. The desired TIAP and Amb Rh for the method 200 may be determined based on the characteristics of the particular forced induction engine system 100 and operating environment of a particular vehicle. The desired percentage of maximum torque output for the EngTorq is determined to avoid purging at high acceleration or power demand conditions to minimize adverse impact on the preformation of the engine by misting too much condensate into the inlet duct 116 to the compressor 106.

The condensate dispersion system 110 and method of operating the condensate dispersion system 200, in essences, controls the rate of condensate removal from the CAC 108 by conveying the condensate back into the combustion airflow to the engine in a metered fashion. Without the condensate dispersion system 110 metering the rate of condensate removal from the outlet tank 122, the amount of condensate accumulated in the outlet tank 122 may cause droplets or plugs of condensate to splash out of the outlet tank 122 into the airflow towards the engine 102. The momentum of the airflow would carry the droplets or plugs of condensate to the engine 102, thereby causing combustion issues resulting in poor engine performance and the engine error codes.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of dispersing condensate from a charge air cooler (CAC) in a forced induction engine system having an engine and a compressor, comprising:
    supplying compressed air, by the compressor, through the CAC to an intake manifold of the engine;
    determining an ambient relative humidity (Amb Rh);
    determining a throttle inlet air pressure (TIAP) of the intake manifold;
    determining a relative engine torque demand (EngTorq %) of the engine; and
    selectively opening a control valve to convey_a condensate from an outlet tank of the CAC through a condensate conveyance tube to an inlet of the compressor when the Amb Rh is above a predetermined humidity, the TIAP is above a predetermined pressure, and the EngTorq% is below a predetermined percent.

2. The method of claim 1, wherein conveying the condensate from the outlet tank of the CAC through the condensate conveyance tube to the inlet of the compressor includes actuating the control valve, disposed in-line with the condensate conveyance tube, into an open position to allow the condensate to flow through the condensate conveyance tube.

3. The method of claim 2, further comprising:
    totalizing an amount of time when both the Amb Rh is above the predetermined humidity and the TIAP is above the predetermined pressure; and
    actuating the control valve after the totalize amount of time is above a predetermined time value.

4. The method of claim 2, further comprising:
    totalizing an amount of time when both the Amb Rh is above the predetermined humidity and the TIAP is above the predetermined pressure;
    determining a second TIAP of the intake manifold after the totalize amount of time is above a predetermined time value; and
    actuating the control valve when the second TIAP is above a second predetermined pressure.

5. The method of claim 4, wherein the EngTorq % is determined after the totalize amount of time is above the predetermined time value.

6. The method of claim 5, wherein actuating the control valve includes cycling the control valve between an open state and a close state at a predetermined frequency and for a predetermined length of time.

* * * * *